United States Patent [19]
Hidaka et al.

[11] Patent Number: 4,763,700
[45] Date of Patent: Aug. 16, 1988

[54] BINDING TOOL

[75] Inventors: Tomoharu Hidaka, Higashimurayama; Yuji Sirakawa, Musashimurayama, both of Japan

[73] Assignee: Nirei Industry Co., Ltd., Mitaka, Japan

[21] Appl. No.: 86,756

[22] Filed: Aug. 18, 1987

[51] Int. Cl.$^4$ .................................................. B21F 9/02
[52] U.S. Cl. .................. 140/93.2; 140/123.6
[58] Field of Search .................. 140/93 A, 93.2, 93.4, 140/123.5, 123.6, 123; 29/811; 100/33 PB

[56] References Cited

U.S. PATENT DOCUMENTS

| | | | |
|---|---|---|---|
| 3,670,782 | 6/1972 | Kabel | 140/93.2 |
| 3,695,308 | 10/1972 | Kabel | 140/93.4 |
| 4,498,507 | 2/1985 | Thompson | 140/93.2 |

Primary Examiner—Lowell A. Larson
Attorney, Agent, or Firm—A. Thomas S. Safford

[57] ABSTRACT

A binding tool for binding electric wires or the like into a sheaf with a band and a small square-sectioned fastener, comprises a tool body with an internal path for containing a plurality of fasteners and a band case containing a band in roll form.

The band is manually drawn out of the band case and is inserted into a passage in the tool body from its rear open end. The band thus inserted into the tool body is pushed out of the front open end of the passage passing through one of the appropriately positioned fasteners and is wound around electric wires or the like. The free end portion of the band is then inserted back into and fastened to the fastener. Then the band is cut off by a cutter moving across the front open end of the tool body.

17 Claims, 4 Drawing Sheets

BINDING TOOL

BACKGROUND OF THE INVENTION

1. Field of the Invention

The present invention relates to a binding tool for tying up electric wires or the like in a bundle by use of a band and a small square-sectioned fastener.

2. Description of the Prior Art

A conventionally known binding tool of this kind is disclosed in Japanese Patent Publication No. 36680/76. This conventional binding tool has an arrangement in which a plurality of interconnected fasteners and a band are fed to the front end portion of the tool, the band is manually wound tightly around electric wires or the like and inserted through the foremost fastener, the end portion of the band is inserted again into the fastener and secured therein and the band and the fastener are cut by manipulating a handle. In this binding tool, since the fasteners are interconnected in a direction perpendicular to the direction of the through hole of each fastener, it is necessary that the fastener feed path in the tool be provided at right angles to an open end of the band path at the front end of the tool.

However, the binding tool of such a structure is not convenient for binding work, because its bulky front end portion hinders visual verification of the binding work. Furthermore, such a binding tool is not easy to handle when the binding work takes place in a narrow space.

Moreover, the fastener for use in this binding tool, such as shown in the above-mentioned Japanese patent publication, is readily deformed by external force. Accordingly, there is the possiblity that the engagement of the fastener with the band becomes unstable, resulting in the band slipping out of the fastener.

SUMMARY OF THE INVENTION

It is therefore an object of the present invention to provide a binding tool which has a small front end portion and hence is easily worked and is easily handled even in a narrow space.

Another object of the present invention is to provide a fastener for the binding tool which can be firmly engaged with the band.

Another object of the present invention is to provide a binding tool which has an arrangement for visually verifying how many fasteners have been consumed.

Another object of the present invention is to provide a binding tool which is capable of holding fasteners in the tool body with certainty.

Another object of the present invention is to provide a binding tool which permits easy loading of the band and the fasteners into the tool body.

Still another object of the present invention is to provide a binding tool which has an arrangement by which the band excessively pulled out of the band case can easily be drawn back thereinto.

Briefly stated, the binding tool of the present invention comprises a tool body for containing fasteners and a band case containing a band in roll form. The band is pulled out of the band case by hand, inserted through the tool body and one of the fasteners, and wound around electric wires or the like and then the free end portion of the band is inserted back into the fastener again and fastened thereto, after which the band is cut off by a cutter moving across the front face of the tool body.

DESCRIPTION OF THE PREFERRED EMBODIMENT

Figure 1:
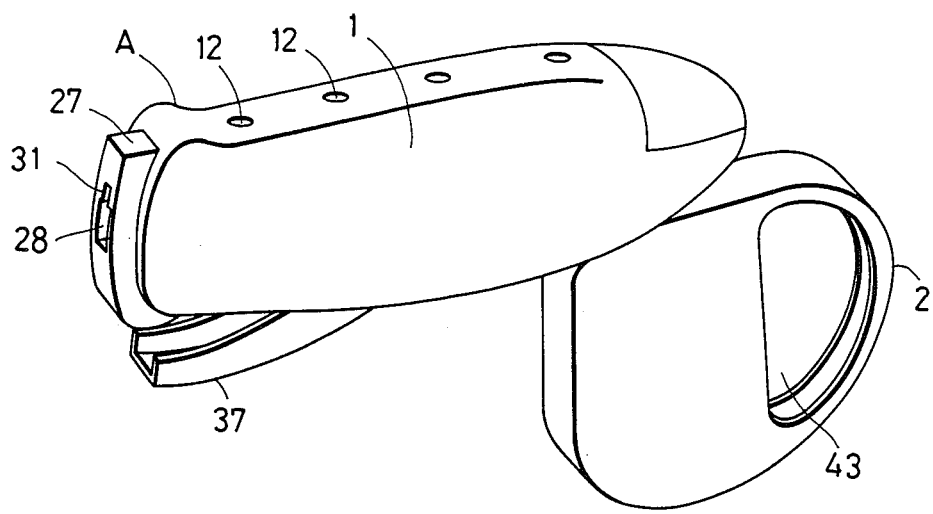
FIG. 1 is a perspective view illustrating the binding tool of the present invention.
Figure 2:
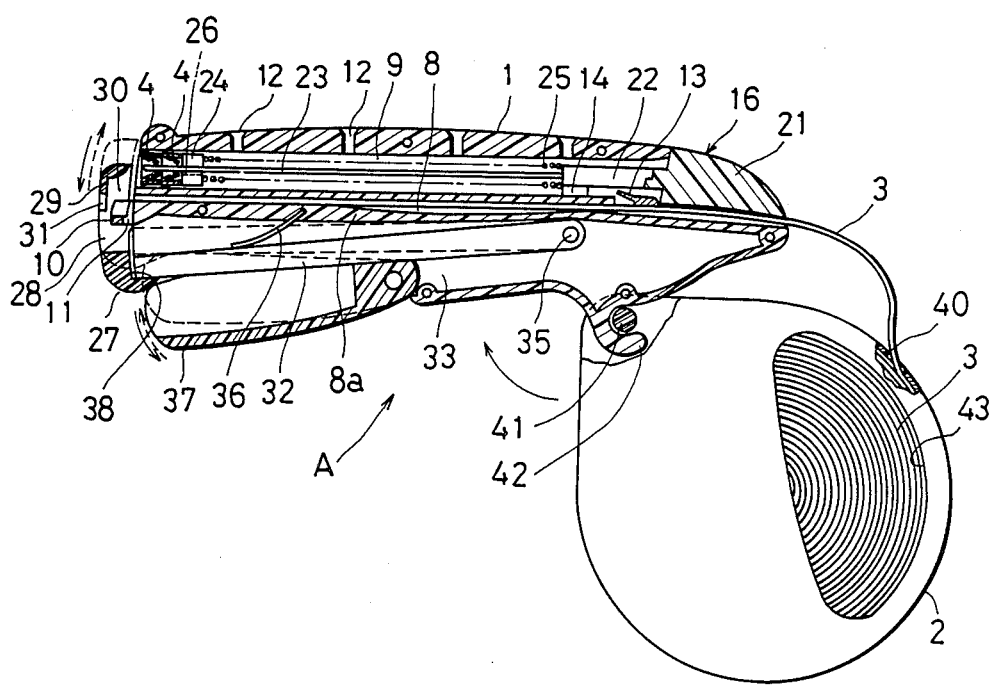
FIG. 2 is an enlarged partially sectional side view of the embodiment of FIG. 1.

In FIGS. 1 and 2 reference character A indicates generally the binding tool of the present invention, which comprises a tool body 1 containing fasteners and band case 2 containing a band 3 in roll form.

Figure 3A:
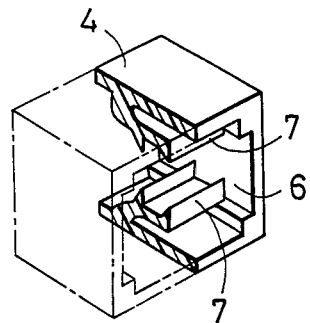
FIG. 3(a) and (b) are a sectional perspective view and a sectional side view respectively of a preferred fastener for use with the binding tool of the present invention.
Figure 3B:
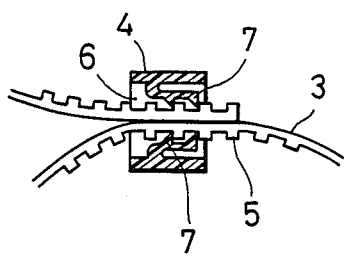

The band 3 has a structure similar to a rack; namely, it has projections and recesses (hereinafter referred to simply as teeth) 5 on one surface as shown in FIG. 3(b). The fastener 4 is a small square-shaped short tubular member, which has a path 6 for the insertion therethrough of the band 3 and has lugs of claws 7 protrusively provided on a pair of opposing inner walls for engagement in the middle of the fastener with the preferably castlated teeth 5 of the band 3.

In the tool body 1 there are provided in parallel a passage 8 through which the band 3 drawn out of the band case 2 is passed from the rear end to the front end of the tool body 1 and a fastener feed path 9 for loading the individual fasteners 4 in single file alignment. The front open ends of the passage 8 and the path 9 are flush with the front end of the tool body and substantially adjacent to each other. The tool body 1 has at its front end a projecting lug 10 on the side of the open end of the passage 8 opposite from the open end of the path 9. The projecting piece 10 has a vertical slot 11 in its base.

The tool body 1, if opaque, preferably has a plurality of windows 12 formed above the fastener feed path 9 so that the fasteners 4 loaded therein can be seen partly or wholly from the outside. In the open rear end portion of the fastener feed path 9 there is provided a flexible stopper piece 13 for engagement with the outermost one of the fasteners loaded in the path 9. Further, there are formed grooves 14 in a pair of opposing side walls of the open rear end portion of the path 9. The stopper piece 13 extends aslant into the path 9 and toward the direction in which the fasteners 4 are loaded into the path 9.

The fasteners 4 are loaded into the path 9 by use of fastener loading means 15 and are pushed forward by push menas 16.

The fastener loading means 15 has a stick portion 18 which extends from a grip 17, which has an H-shaped cross-section, and the front end of which has a fork end 19, each arm of the fork end 19 having a protrusion 20.

Figure 4A:
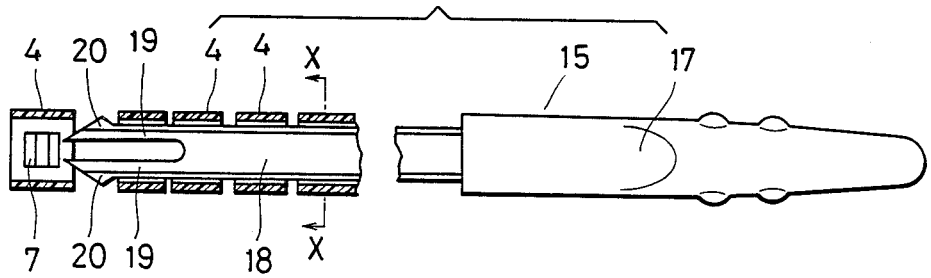
FIG. 4(a) is a plan view of fastener loading means.
Figure 4B:
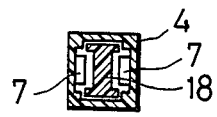
FIG. 4(b) is a cross-sectional view taken on the line X—X in FIG. 4(a)

When the fasteners 4 are positioned on the stick portion 18 of the loading means 15, they strike against the protrusions 20 of the fork end 19, but since the arms of the fork end 19 are slanted inward, the fasteners 4 can easily be put on the stick portion 18. In this instance, there is no fear of the lugs 7 of the fasteners 4 being damaged, since they are held out of contact with the stick portion 18 of the loading means 15 [see FIG. 4(b)].

Figure 5:
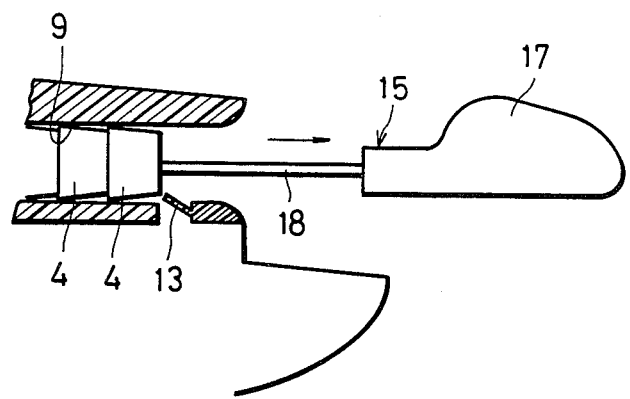
FIG. 5 is a schematic diagram for explaining the loading of fasteners into the tool body by the fastener loading means.

The fastener loading means 15 with the fasteners 4 thus mounted thereon is inserted into the fastener feed path 9 through its rear open end over the entire length of the stick portion 18, after which the loading means 15 is pulled back out of the fastener feed path 9 by means of the grip 17. In this case, the stick portion 18 is pulled out of the path 9, but no fasteners will fall out of the path 9 because the outermost fastener 4 is engaged with the unidirectional stopper piece 13 provided at the rear open end of the path 9 as depicted in FIG. 5.

Figure 6:
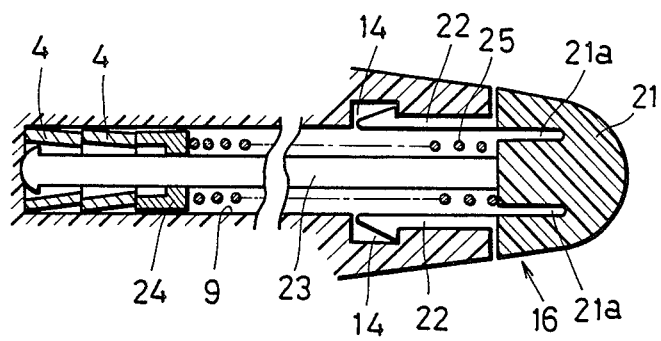
FIG. 6 is a schematic diagram for explaining how fastener pusher means is mounted in the tool body.

The fastener push means 16 is composed of a knob 21 having longitudinal grooves 21a, short locking pieces 22 each extending from the knob 21 on the outside of one of the grooves 21a and a long push guide 23 also extending from the knob 21 centrally thereof between the grooves 21a as shown in FIGS. 2 and 6. A push block 24 is slidably mounted on the push guide 23 and is always biased forward by a spring 25. The fastener push means 16 is inserted into the fastener feed path 9 from its rear open end after loading therein the fasteners 4. When the push means 16 is inserted into the fastener feed path 9, the push guide 23 passes through the fasteners 4 and the push block 24 engages the rear most fastener 4, and accordingly the spring 25 is compressed; further, both locking pieces 22 are locked into the grooves 14 in the fastener feed path 9. Thus the push means 16 is held by the tool body 1. The push means 16 can easily be removed from the tool body 1 simply by pressing the knob 21 on the both sides thereof so that the locking pieces 22 are moved inward to disengage from the grooves 14. Incidentally, since the push block 24 has a relief 26 for preventing engagemnt with the stopper piece 13, the push means 16 can smoothly be pulled out of the fastener feed path 9.

The tool body 1 has a working head 27 which moves up and down along the front of the body 1. The head 27 is hollow and has an opening 28 in its front wall 29 centrally thereof. The front wall 29 of the head 27 just above the opening 28 forms on the inside thereof a fastener holding portion 30. The opening 28 is large enough to permit the passage therethrough of the fastener 4. In the center of the front wall 29 there is provided a U-shaped recess or groove 31 which is a little wider than the band 3 and directly contiguous to the opening 28.

The head 27 is mounted on the tip of an actuating arm 32, which is housed in a recess 33 formed under the band passage 8 of the tool body 8 and the rear end of which is pivotally secured, by a pin 35 to both of the side walls which form the recess 33.

A return spring 36 is fixed at one end to the ceiling 8a of the recess 33, with the free end abutting against the upper face of the arm 32. A lever 37 is pivotally secured to the underside of the tool body 1, with the upper face of the former abutting against the underside of the arm 32. Accordingly, the working range of the arm 32 is limited by the lever 37 and the return spring 36, with the result that the head 27 is set to move up and down between a first position where the fastener holding portion 30 is aligned with the front open end of the fastener feed path 9 (as indicated by the broken lines in FIG. 2) and a second position where the fastener holding portion is aligned with the front open end of the bond passage 8 (as indicated by the solid lines in FIG. 2).

The arm 32 further carries at its tip a vertically extending cutter 38 integrally formed with the head 27 in the back thereof. The cutter 38 is disposed so that as the head 27 is brought up from the above-mentioned second position toward the first position, the cutter also moves up through the slot 11 of the projecting piece 10 and across the front open end of the band passage 8 in association with the upward movement of the head 27.

The band case 2 has an opening 40 through which the band 3 is drawn out, and has at one end a coupling shaft 41 which extends crosswise of the case 2.

By engaging the shaft 41 with a curved engaging piece 42 provided on the underside of the tool body 1, the band case 2 is detachably mounted on the tool body 1 in a manner to be rotatable relative thereto over a certain angular range. Turning the band case 2 forward, the binding tool A becomes less bulky and can easily be packaged. Furthermore, the band case 2 has in its one side a relatively large opening 43, through which the band 3, when drawn out excessively from the case 2, can be drawn back thereinto by manually rewinding it. The band case 2 is attached to the tool body 1 on the opposite side from the fastener feed path 9 with respect to the band passage 8.

Next, a description will be given how the binding tool A is used actually for tying up electric wires or the like in a bundle.

At first, the band 3 is drawn out of the case 2, inserted into the band passage 8 of the tool body 1 at the rear open end, and then pulled out of the pasage 8 from the front open end thereof. On the other hand, the fasteners 4 are loaded into the fastener feed path 9 and the push means 16 is inserted thereinto as described previously. Thus the fasteners 4 are always pushed forward.

Figure 7A:
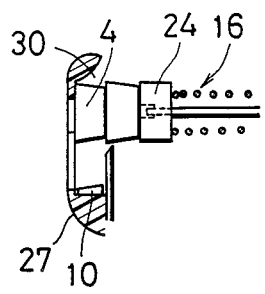
FIG. 7(a), (b), (c), (d) and (e) are schematic diagrams for explaining the operation of a slidable head on the binding tool.

In the case of binding electic wire or the like 45 into a sheaf, the lever 37 is pressed upward with fingers to push up the arm 32 against the force of the return spring 36, moving the head 27 to the first position (see FIG. 7(a)). As a result of this, the fastener holding portion 30 of the head 27 is aligned with the front open end of the fastener feed path 9 and the first one of the fasteners 4, which are pushed by the push means 16, pops into the fastener holding portion 30.

Figure 7B:
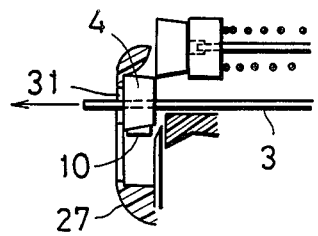

Then, releasing the lever 37, the arm 32 is lowered by the return spring 36 and the head 27 is also moved down to the second position where the faster 4 held in the fastener holding portion is aligned with the front open end of the band passage 8 and held against the the projecting piece 10 (see FIG. 7(b)). Then, by pushing the band 3 forward through the band passage 8 from the rear open end thereof, the top end portion of the band 3 projects out forwardly of the head 27 after passing through the path 6 of the fastener 4 held in the head 27 and through the accommodating recess 31 of the fastener holding portion 30. In this case, the band 3 is guided by the passage 8 of the tool body 1 to travel along the center of the space defined between the claws 7 of the fastener 4 and thus the teeth 5 of the band 3 do not engage the claws 7; therefore, the band 3 is fed out smoothly.

Figure 7C:
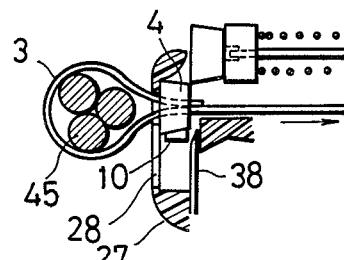

Following this, the projecting end portion of the hand 3 is further pulled out by hand, the band 3 thus drawn out is wound around the electric wires 45, and then the end portion of the band 3 is inserted back again into the fastener 4 held in the fastener holding portion 30 of the head 27 (see FIG. 7(c)). Then, the band 3 is tightened by pulling it back through the tool body 1 by manually gripping the band 3 between the rear open end of the band passage 8 and the band case 2. This engages the teeth 5 of the band 3 with the claws 7 of the fastener 4 as shown in FIG. 3(b), whereby the electric wires 45 are tightly fastened together.

Figure 7D:
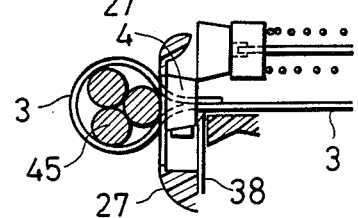
Figure 7E:
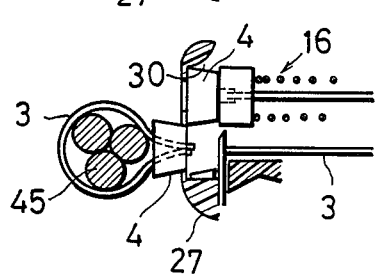

After this, when the lever 37 is brought up again to move the head 27 to the first position, the cutter 38 is also moved up, passing through the slot 11 in the base of the projecting piece 10 and across the front open end of the band passage 8. On the other hand, since the fastener 4 is held in front of the front open end of the passage 8, the band 3 is cut off by the cutter 38 in the vicinity of the rear end face of the fastener 4 (see FIG. 7(d)). At this time, the fastener holding portion 30 lies at the second position where it is aligned with the fastener feed path 9, and accordingly the release opening 28 of the head 27 is also in alignment with the band passage 8. Therefore, the fastener 4 fastening the both end portions of the band 3 together is free to escape from the inside of the head 27 through the opening 28 (see FIG. 7(e)). Thus a single binding cycle is completed. Incidentally, since the head 27 is in the first position, the next fastener 4 is automatically fed into the head 27, making the binding tool A ready for the next binding cycle.

As described above, according to the present invention, since the band passage 8 and the fastener feed path 9 are formed in parallel in the tool body 1 lengthwise thereof, the front end portion of the binding tool A is small. This permits easy visual inspection of the work to ensure accurate binding and allows easy work in a narrow space. Furthermore, since the front open ends of the band passage 8 and the fastener feed path 9 can be made flush with the front of the tool immediately adjacent each other, the fastener 4 needs only to be moved between the first and second positions. This minimizes the distance of movement of the fastener 4; accordingly, the stroke of the head 27 is also small and the binding tool is easy to handle.

Moreover, the claws 7 of the fastener 4 are formed on the inside walls thereof, and hence are not readily affected by external force and are not likely to be deformed. This ensures firm and accurate engagement of the claws 7 with the teeth 5 of the band 3.

In addition, since the tool body 1 has formed therein the windows 12 just above the fastener feed path 9, it is possible to visually check how many fasteners 4 have been consumed.

Besides, since the stopper piece 13 is provided at the rear end of the fastener feed path 9, the fasteners 4 loaded in the tool body 1 do not come out therefrom but are securely held therein. Accordingly, the fasteners 4 can be loaded easily and surely.

Further, since the band case 2 is detachably mounted on the tool body 12, loading of the band 3 can easily be achieved by exchanging the band case 2. Since the band case 2 is attached to the tool body 1 on the opposite side from the fastener feed path 9 with respect to the band passage 8, the band 3 fed from the case 2 to the passage 8 does not hinder the loading of the fasteners 4. Even if the band 3 is excessively drawn out of the case 2, the excess band does not hinder the binding work because it can be drawn back into the case 2 by turning the roll of band 3 through the opening 43 formed in one side of the case 2.

It will be apparent that many modifications and variations may be effected without departing from the scope of the novel concepts of the present invention.

What is claimed is:

1. A binding tool comprising:
   a tool body; and
   a band case capable of containing a binding band in roll form;
   wherein the tool body has formed therein in parallel a band passage through which the band can be passed and a fastener feed path in which a plurality of fasteners can be loaded seriatim thereinto from the rear open end thereof in alignment;
   wherein a working head is slidably mounted on the front face of the tool body and is formed with a lower release opening of a size large enough to permit the passage therethrough of the fasteners and an upper fastener holding portion communicating with the opening;
   wherein the working head is movable between a first position where the fastener holding portion is aligned with the front open end of the fastener feed path and the working head is capable of holding in the fastener holding portion a fastener fed out of the front end portion of the fastener feed path and a second position where the fastener holding portion is aligned with the front open end of the band passage such that a band passing out from the front end of said passage can be inserted through any fastener held in the fastener holding portion;
   wherein a cutter is disposed in the vicinity of the working head, the cutter being movable across the front open end of the band passage in association with the working head when the latter moves from the second position to the first position; and
   wherein a lug is positioned just below said band passage so as to secure a fastener in said fastener holding portion of said head when the latter is in said second position.

2. A binding system, comprising the tool of claim 1, a band case detachably mountable on said tool, a band substantially in roll form carried in said case and having on at least one side an alternating series of projections and recesses, a plurality of fasteners in said feed path each having a through hole for the insertion back-and-forth therethrough of said band and further having internal claws protrusively provided each on a respective one of a pair of opposing inner walls for ratchet-like locking engagement with the projections and recesses of the band.

3. The binding tool of claim 1, wherein the tool body has formed therein a window through which the fasteners loaded in the fastener feed path can be seen partly or wholly from the outside.

4. The binding tool of claim 1, wherein a stopper piece is provided in the rear open end portion of the fastener feed path, and the stopper piece extends aslant along the direction of loading of the fasteners and partly into the fastener feed path.

5. The binding tool of claim 1, wherein the band case is detachably mounted on the tool body on the opposite side of the fastener feed path with respect to the band passage.

6. The binding tool of claim 5, wherein the band case has an opening in one side.

7. A binding tool for applying fasteners to a binding band cut from a continuous strip thereof comprising:

a tool body having formed therein a band passage and a fastener feed path into which a plurality of aligned fasteners can be loaded from the rear open end thereof; said passage and said path being open at either end and extending from rearward portions of said body to adjacent openings in a forward face thereof;

a working head having an upper fastener holding portion with an outer band-accommodating slot and a lower fastener release portion with an outer opening for accommodating passage of said fastener therethrough, the working head being movable across the front face of the tool body between a first position where the fastener holding portion is aligned with the front open end of the fastener feed path to receive and hold a fastener delivered from said feed path and a second position where the fastener holding portion is aligned with the front open end of the band passage such that a band passing out from said passage would be inserted through a fastener held in the fastener holding portion and would extend out through said head, a cutter positioned to coact with said working head, the cutter being movable across the front open end of the band passage in association with the working head when the latter moves from the second position to the first position so as to cut any band extending out from said open end of said passage, and a stop lug projecting outwardly from the face of said tool body and into said working head from immediately adjacent the front end opening of said passage on the side of said passage opposite from said path and thereby being positioned to secure therein any fasteners within said fastener holding portion when the latter is in said second position.

8. The binding tool of claim 7, further comprising a band case capable of containing a binding band in roll form.

9. The binding tool of claim 8, wherein the band case is detachably mounted on the tool body on the opposite side from the fastener feed path with respect to the band passage.

10. The binding tool of claim 9, wherein the band case has an opening in one side.

11. The binding tool of claim 9, further comprising biasing means for forcing any fasteners in said path to the forward end thereof for urging fasteners seriatim into said fastener holding portion of said head when the latter is in said first position.

12. The binding tool of claim 11, wherein a stopper piece is provided in the rear open end portion of the fastener feed path, and the stopper piece extends aslant along the direction of loading of the fasteners and partly into the fastener feed path.

13. The binding tool of claim 12, further comprising a spring-loaded lever means interconnected with said head for biasing said head towards said second position.

14. The binding tool of claim 13, wherein the tool body has formed therein at least one observation window through which fasteners loaded into the fastener feed path can be seen partly or wholly from the outside.

15. The binding tool of claim 7, further comprising biasing means for forcing any fasteners in said path to the forward end thereof for urging fasteners seriatim into said fastener holding portion of said head when the latter is in said first position.

16. A binding system, comprising the tool of claim 7, a band case detachably mountable on said tool, a band substantially in roll form carried in said case and having on at least one side an alternating series of projections and recesses, a plurality of fasteners in said feed path each having a through hole for the insertion back-and-forth therethrough of said band and further having internal claws protrusively provided each on a respective one of a pair of opposing inner walls for ratchet-like locking engagement with the projections and recesses of the band.

17. The binding system of claim 16, further comprising biasing means for forcing any fasteners in said path to the forward end thereof for urging fasteners seriatim into said fastener holding portion of said head when the latter is in said first position.

* * * * *

UNITED STATES PATENT AND TRADEMARK OFFICE
Certificate

Patent No. 4,763,700                                                             Patented: August 16, 1988

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tomoharu Hidaka, Tokyo, Japan; Yuji Sirakawa, Tokyo, Japan; and Shigenobu Nirei, Tokyo, Japan.

Signed and Sealed this Fifteenth Day of December, 1998.

JOSEPH J. HAIL, III
*Supervisory Patent Examiner*
Art Unit 3725